United States Patent
Arndt et al.

(10) Patent No.: US 7,574,537 B2
(45) Date of Patent: Aug. 11, 2009

(54) METHOD, APPARATUS, AND COMPUTER PROGRAM PRODUCT FOR MIGRATING DATA PAGES BY DISABLING SELECTED DMA OPERATIONS IN A PHYSICAL I/O ADAPTER

(75) Inventors: Richard Louis Arndt, Austin, TX (US); David F. Craddock, New Paltz, NY (US); Thomas Anthony Gregg, Highland, NY (US); Donald William Schmidt, Stone Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 11/050,332

(22) Filed: Feb. 3, 2005

(65) Prior Publication Data

US 2006/0179177 A1    Aug. 10, 2006

(51) Int. Cl.
G06F 3/00    (2006.01)
(52) U.S. Cl. .................. 710/36; 710/240; 711/165
(58) Field of Classification Search .............. 710/32, 710/36, 14, 240
See application file for complete search history.

(56) References Cited

U.S. PATENT DOCUMENTS

| | | | | |
|---|---|---|---|---|
| 4,475,155 A | * | 10/1984 | Oishi et al. | 710/22 |
| 5,634,099 A | * | 5/1997 | Andrews et al. | 709/212 |
| 5,717,952 A | * | 2/1998 | Christiansen et al. | 710/22 |
| 2003/0191881 A1 | * | 10/2003 | Arndt et al. | 710/240 |
| 2004/0064601 A1 | | 4/2004 | Swanberg | |
| 2006/0069818 A1 | | 3/2006 | Mather et al. | |
| 2007/0260768 A1 | | 11/2007 | Bender et al. | |

OTHER PUBLICATIONS

U.S. Appl. No. 11/380,052, filed Apr. 25, 2006, Arndt et al.

* cited by examiner

Primary Examiner—Henry W. H. Tsai
Assistant Examiner—Elias Mamo
(74) Attorney, Agent, or Firm—Yee & Associates, P.C.; Diana R. Gerhardt (57) ABSTRACT

A method, apparatus, and computer program product are disclosed in a data processing system for migrating data pages subject to DMA access by temporarily disabling selected DMA operations within a physical I/O adapter. A determination is made as to whether to disable data access DMA capabilities of the physical I/O adapter. An operating mode of the physical I/O adapter is set to a particular mode utilizing a mode bit according to the determination of whether to disable data access DMA capabilities. Only data access DMA capabilities of the physical I/O adapter are disabled when the mode bit is set. Administrative services operations continue to be performed by the physical I/O adapter when the data access DMA capabilities of the physical I/O adapter are disabled.

18 Claims, 5 Drawing Sheets

METHOD, APPARATUS, AND COMPUTER PROGRAM PRODUCT FOR MIGRATING DATA PAGES BY DISABLING SELECTED DMA OPERATIONS IN A PHYSICAL I/O ADAPTER

BACKGROUND OF THE INVENTION

1. Technical Field

The present invention relates to data processing systems, and in particular to migration of data between (I/O) devices. More particularly, the present invention physical pages that are subject to access by input/output relates to disabling only selected DMA operations in a physical I/O adapter in order to permit migration of data between physical pages that are subject to access by the physical I/O adapter.

2. Description of Related Art

According to a trend in computer systems, a system may be reconfigured while running without disrupting data processing. For example, with multiple operating systems running on the computer, a first one of the operating systems may be using a certain block of memory and there may be a need to reallocate the block of memory for use by a second one of the operating systems. Thus, the first operating system must first stop using the block of physical memory. As another example, a problem may be detected in a block of physical memory, in which case it may be desirable to remove the memory from operation so that it can be replaced. Thus, the data within a particular physical page may need to be moved or use of the physical page may need to be blocked for a period of time. If this block of memory is subject to access by I/O devices the problem of migrating or blocking the use of the physical page becomes difficult.

One method for migrating data that is subject to access by an I/O device is to temporarily but completely disable all arbitration that is done by the I/O adapter to which the I/O device is coupled in order to access the particular physical page. The process of arbitration is the first step taken during a DMA process. When arbitration is disabled, therefore, all DMA operations of the physical I/O adapter are disabled. Thus, for a short time period, all DMA operations for the physical I/O adapter that needs to access the data that is to be migrated are totally disabled when arbitration is disabled. During the short time period, the physical page data is then either migrated or updated. Once the migration or update of the physical page is complete, the DMA operations are once again enabled in the I/O adapter.

DMA operations include both data access operations to access the data as well as administrative services operations. These administrative services operations are typically executed in the background. Some physical I/O adapters require the ability to be able to execute administrative services operations in order to operate properly. For example, some physical I/O adapters use administrative services operations to access registers that are included in the particular physical I/O adapter. When arbitration is disabled in a physical I/O adapter as described above, all DMA operations, including data accesses and administrative services operations, are disabled. If the ability to execute administrative services operations is disabled even temporarily in an I/O adapter that requires these administrative services operations in order to function properly, the physical I/O adapter will enter an error state. This will cause the processor to cease processing.

Therefore, a need exists for a method, apparatus, and computer program product for disabling only selected DMA operations in a physical I/O adapter in order to permit migration of physical pages that are subject to access by the physical I/O adapter.

SUMMARY OF THE INVENTION

A method, apparatus, and computer program product are disclosed in a data processing system for temporarily disabling selected DMA operations within a physical I/O adapter. A determination is made as to whether to disable data access DMA capabilities of the physical I/O adapter. An operating mode of the physical I/O adapter is set to a particular mode utilizing a mode bit according to the determination of whether to disable data access DMA capabilities. Only data access DMA capabilities of the physical I/O adapter are disabled when the mode bit is set. Administrative services operations continue to be performed by the physical I/O adapter when the data access DMA capabilities of the physical I/O adapter are disabled.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a method, apparatus, and computer program product for temporarily disabling selected DMA operations within a physical I/O adapter in order to permit migration of pages. When data pages are to be migrated, the I/O controller will set the mode bit in order to temporarily disable data accesses to by physical I/O adapters to those pages.

A determination is made as to whether to disable data access DMA capabilities of the physical I/O adapter. A determination to disable data access DMA capabilities is made when data pages are to be migrated. An operating mode of the physical I/O adapter is set to a particular mode utilizing a mode bit according to the determination of whether to disable data access DMA capabilities. Only data access DMA capabilities of the physical I/O adapter are disabled when the mode bit is set. Administrative services operations continue to be performed by the physical I/O adapter when the data access DMA capabilities of the physical I/O adapter are disabled.

When an I/O request is received that is to be processed by a particular physical I/O adapter, the I/O controller will make two determinations. The I/O controller will determine whether the mode bit associated with this particular physical I/O adapter is set which indicates that data accesses are temporarily disabled for this physical I/O adapter. The I/O controller will also look at the I/O request itself to determine whether the request is a request for data access or whether the request is an administrative services request.

If the I/O controller determines that the mode bit is set and the request is a data access request, the I/O controller will postpone the processing of this request by placing the request back in a processing queue. If the I/O controller determines either that the mode bit is not set or that the request is not a data access request, the I/O controller will then process the request.

Figure 1:
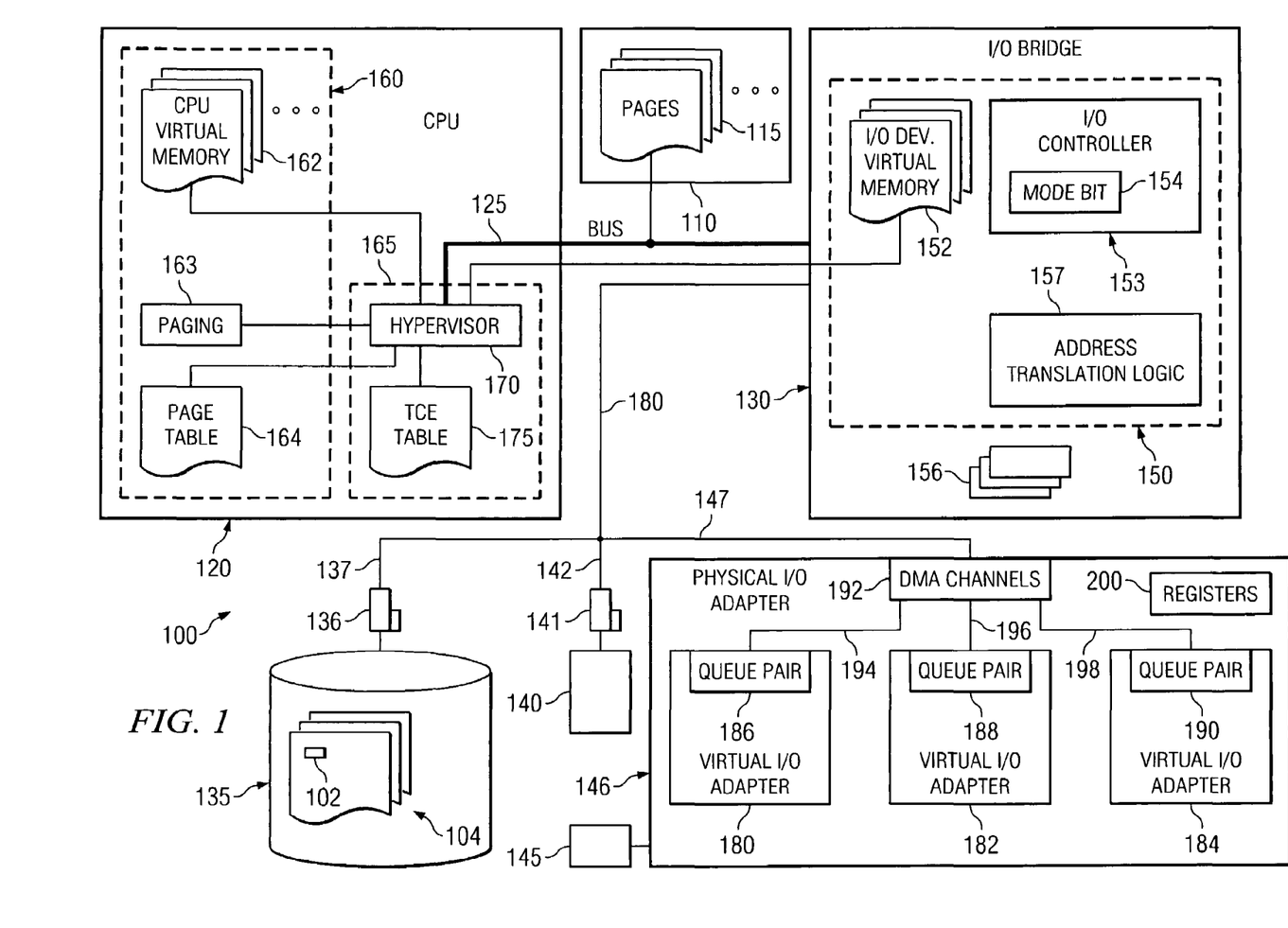
FIG. 1 is a high level block diagram that depicts a computer system that includes the present invention in accordance with the present invention.

FIG. 1 is a high level block diagram that depicts a computer system 100 that includes the present invention in accordance with the present invention. Data 102 is stored in computer system 100. Data 102 is stored in memory, e.g., disk storage 135. Blocks 104 of data 102 are written from nonvolatile memory 135 to the main memory 110. Blocks 104 of data 102 are referred to as physical pages 115 of data, to distinguish them from references to data 102 having the viewpoint of a virtual memory mapping, as will be explained further herein below. Memory 110 may be referred to as main memory or physical memory.

The blocks of data in memory 110 are accessible by I/O devices 135, 140, and 145 and a central processing unit (CPU) 120 of computer system 100. As used herein, the term I/O device refers to any of a variety of devices which interface to computer system 100 and provide information to the system or receive information from the system. Examples of I/O devices include a memory, disk storage 135, a mouse, a track ball, touch pad or the like, a keyboard, a display, a printer, a camera, a modem, an optical scanner, a microphone, an audio speaker, etc.

More specifically, physical pages 115 are coupled by a first bus 125 to an I/O bridge 130. Each of the I/O devices 135, 140, 145 is coupled to the I/O bridge 130 by a corresponding I/O adapter 136, 141, and 146 and segment 137, 142, 147 of an I/O bus 180. The I/O bridge 130 also has logic 150, including bus logic that arbitrates among the I/O devices 135, 140, 145, that is, that grants the I/O devices access one-at-a-time to the I/O bus 180. Logic 150 arbitrates between I/O bus 180 and first bus 125. I/O bridge 130 also includes I/O data buffers 156 for caching data 102 from a physical page 115 or an I/O device, such as memory 135, responsive to requests by the I/O devices. Logic 150 includes logic that handles the data buffering. I/O bridge logic 150 includes an I/O controller, also called an I/O processor, 153.

I/O controller 153 includes a mode bit 154. The mode bit 154 is used to set the current operating mode for a particular physical I/O adapter. Although only one mode bit is depicted, there would be included in I/O controller 153 a separate independent mode bit for each physical I/O adapter. In this manner, each physical I/O adapter may operate in a mode that is independent from the current operating mode of the other physical I/O adapters.

Alternatively, a separate mode bit may be included in I/O controller 153 for each queue pair so that each virtual I/O adapter in each physical I/O adapter may operate in a mode that is independent from the current operating mode of the other virtual I/O adapters in each of the physical I/O adapters.

CPU 120 executes operating system and firmware instructions, images of which are represented in FIG. 1 as operating system 160 and firmware 165. Instructions for execution by CPU 120 include firmware instructions 165, operating system instructions 160 that run with the support of the firmware 165, and application instructions (not shown) that run with the support of the firmware 165 and operating system 160. It should be appreciated that firmware 165 runs on processor 120 substantially independently of the operating system 160 and provides a lower level of interface and therefore greater access to hardware components such as processor 120 than does the operating system 160.

Operating system 160 presents to applications running on CPU 120 a view of blocks 104 of data 102 as pages of virtual memory 162 so that the actual location of data 102 is transparent, regardless of whether the data is in memory 110 or on disk storage 135, for example. Accordingly, operating system 160 includes a paging mechanism 163 and page table 164 for transparently moving data 102 in and out of memory 110.

Operating system 160 directs the I/O logic 150 to map blocks 104 of data 102 to physical pages 115 via entries in a translation control entry (TCE) table 175. In the embodiment illustrated, firmware 165 provides services that are put to use for moving data from a first one of the physical pages 115 to a second one of the physical pages 115 so that the first page can be put to a different service or idled. To do this, operating system 160 finds a set of one or more entries for the first one of the physical pages 115 in TCE table 175. Then operating system 160 directs a firmware 165 component, e.g., Hypervisor 170, to copy the data from the first physical page 115 associated with a given I/O device virtual memory page 152 to the second physical page 115, then to change the associated mapping in the TCE Table 175 such that future accesses to I/O device virtual memory page 152 are directed to the second physical page. Hypervisor 170 has a number of functions, including among others, keeping TCE table 175 updated and maintaining memory coherency with respect to I/O operations.

To understand TCE table 175, consider that I/O devices 135, 140, 145 each have their own view of data 102 as pages of virtual memory 152, similar to the virtual memory view of the CPU 120. I/O bridge logic 150 presents this view to the I/O devices 135, 140, 145. In other embodiments, I/O controller 153 and firmware 165 present this view to I/O devices 135, 140, 145. To maintain this view, the entries (not shown in FIG. 1) in TCE table 175 map the blocks 104 of data 102 to I/O virtual memory pages 152. Accordingly, I/O devices 135, 140, 145 may refer to data 102 by reference to virtual page 152 regardless of the actual location of the data, that is, regardless of which physical page 115 may be currently storing the data.

I/O bridge 130 provides logic 150 that lies between bus 125 and bus 180. Memory requests on bus 180 come in from I/O devices with virtual addresses to reflect I/O device virtual memory 152. Address translation logic 157 effectively accesses TCE Table 175 (which is kept in I/O device virtual page order) to determine the physical page address that it should apply to bus 125 in order to access the correct physical page 115 associated with the memory request from bus 180.

Each I/O adapter 135, 140, 146 is capable of simulating thousands of virtual I/O adapters. Each virtual adapter is a virtualization of the underlying physical adapter. Each virtual adapter is a logical representation of an I/O adapter that acts independently from the other virtual adapters as if each virtual adapter were its own separate physical I/O adapter.

I/O adapter 146 includes three virtual adapters 180, 182, and 184. Each virtual adapter has its own queue pair. Each queue pair consists of a send work queue and a receive work queue. The send work queue is used to send messages. The receive work queue receives messages.

Virtual I/O adapter 180 includes queue pair 186. Virtual I/O adapter 182 includes queue pair 188. Virtual I/O adapter 184 includes queue pair 190.

A virtual I/O adapter uses its queue pair in order to transmit and receive data between the virtual I/O adapter and DMA channels 192. Multiple DMA channels exist within physical I/O adapter 146. Each virtual I/O adapter has its own queue pair which is used to provide a separate DMA channel for the virtual I/O adapter. For example, queue pair 186 is used by virtual I/O adapter 180 to communicate with bus 147 through dedicated DMA channel 194. Queue pair 188 is used by virtual I/O adapter 182 to communicate with bus 147 through dedicated DMA channel 196. Queue pair 190 is used by virtual I/O adapter 184 to communicate with bus 147 through dedicated DMA channel 198.

Physical I/O adapter 146 also includes registers 200. Registers 200 are memory mapped input/output (MMIO) registers that are used by the virtual I/O adapters included within physical I/O adapter 146. Physical I/O adapter 146 virtualizes registers 200 by saving the state of registers 200 in main memory 110. DMA operations to physical I/O adapter 146 must be able to access registers 200. If the ability to access registers 200 is disabled, I/O adapter 146 cannot operate. If DMA operations to physical I/O adapter 146 were disabled and the processor were to attempt an MMIO operation targeting physical I/O adapter 146, the processor would not be able to complete the MMIO operation resulting in an error condition in the processor.

When data is being migrated, however, not all DMA operations in physical I/O adapter 146 need to be disabled. DMA operations are one of two different types: data access operations or administrative services operations. The process of saving the state of registers 200 in memory 110 is an administrative services operation performed by the DMA operations of I/O adapter 146. In order to be able to properly migrate data, only the data access operations need to be disabled. The administrative services operations must be able to continue to operate while the data is being migrated in order for the I/O adapter to continue to function properly. Therefore, the present invention provides a method, system, and product for disabling only the data access operations in a physical I/O adapter. When the data access operations are disabled, the administrative services operations remain enabled. Therefore, data can be migrated while the physical I/O adapter continues to function properly.

Figure 2:
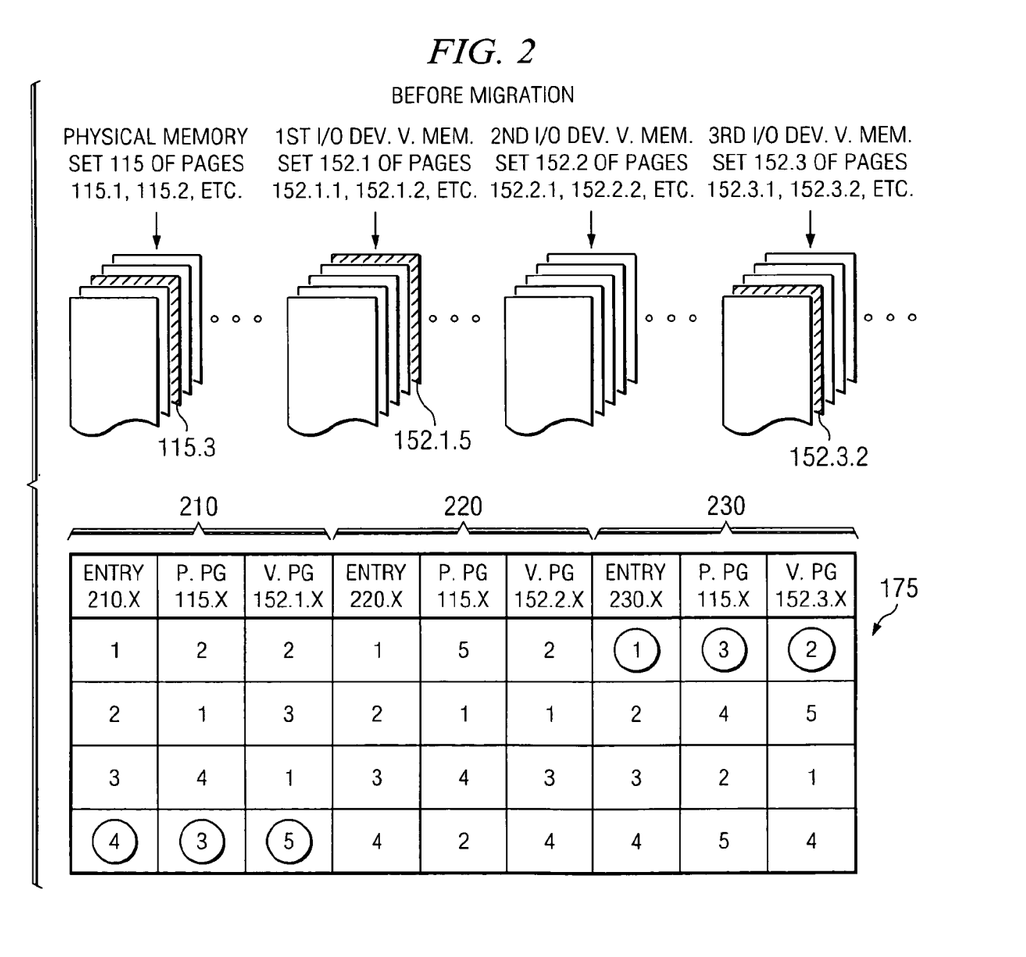
FIG. 2 illustrates an example of the state of the computer system of FIG. 1 prior to migrating data from a first physical page in accordance with the present invention.
Figure 3:
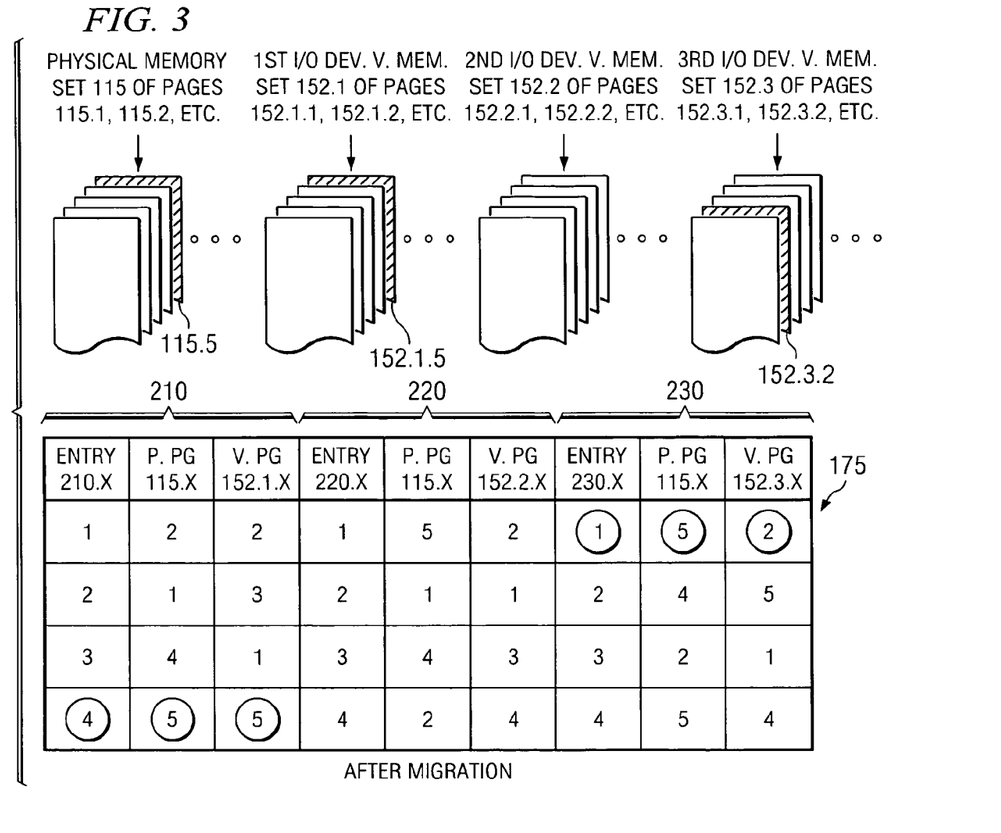
FIG. 3 illustrates an example of the state of the computer system of FIG. 1 after migrating data from a first physical page in accordance with the present invention.

The following, with reference to FIGS. 2 and 3, is a description of the process of migrating data. FIG. 2 illustrates an example of the state of the computer system of FIG. 1 prior to migrating data from a first physical page in accordance with the present invention. TCE table 175 and a number of physical pages 115 and I/O virtual memory pages 152 are shown in more detail to illustrate an example of migrating data from a first one of the physical pages 115. Specifically, individual ones of physical pages 115 may be referred to as 115.1, 115.2, etc. In the example illustrated, data from page 115.3 is targeted for migrating. Virtual memory pages 152 are shown from the viewpoint of respective I/O devices 135, 140, 145. That is, a first set of pages 152.1 is intended to be accessed by a first I/O device, e.g., disk 135, a second set of pages 152.2 is intended to be accessed a second I/O device, e.g., device 140, and a third set 152.3 is intended to be accessed by a third I/O device 145.

The sections 210, 220, 230 and specific entries 210.1, 210.2, etc. in each section are shown for TCE table 175. These sections correspond to respective first, second, etc. I/O devices, e.g. devices 135, 140, 145. In this manner, the section in the table 175 in which an entry is located indicates the I/O device that may access the physical page corresponding to that entry. In the example illustrated, the targeted physical page 115.3 is viewed by the first I/O device as virtual memory page 152.1.5, while it is viewed by the third I/O device as virtual memory page 152.3.2. Based on the lack of entries in the second section 220 of table 175 for the page 115.3, Hypervisor 170 determines that the second I/O device has no mapping to page 115.3. Thus, page 115.3 is not subject to access by the second I/O device.

Summarizing the above description, Hypervisor 170 has identified the I/O devices which may access page 115.3 (and those which may not) by finding entries for physical page 115.3 in table 175. Specifically, Hypervisor 170 has determined that the first I/O device 135 and the third I/O device 145 may access page 115.3.

Data buffers 156 on DMA writes are automatically written back by bridge 130 hardware when they are full. If they are partially filled and waiting for a subsequent DMA request to either fill them or reference a discontiguous address range (indicating that the DMA will not be filling the buffer), then they are outstanding. Consequently, before moving data from one physical page 115 to another, Hypervisor 170 flushes the I/O data buffers 156. In the present example, data from I/O data buffers 156 is selectively written back to physical page 115.3. The forced write back is to flush out such partially written I/O buffers.

FIG. 3 illustrates an example of the state of the computer system of FIG. 1 after migrating data from a first physical page in accordance with the present invention. Once the data is moved, Hypervisor 170 updates the set of entries in table 175. As shown, after the update, entry 210.4 references virtual page 152.1.5 to the new physical page 115.5, and the entry 230.1 references virtual page 152.3.5 to the new physical page 115.5.

Figure 4A:
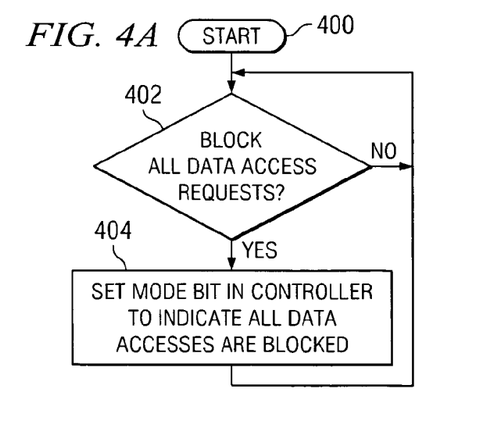
FIG. 4A depicts a high level flow chart that illustrates setting the operating mode of a physical I/O adapter to a particular mode in order to disable only the data access DMA capabilities of the physical I/O adapter, and not the administrative services operations, so that all data accesses to the physical I/O adapter are blocked in accordance with the present invention.

FIG. 4A depicts a high level flow chart that illustrates setting the operating mode of a physical I/O adapter to a particular mode in order to disable only the data access DMA capabilities, and not the administrative services operations, of the physical I/O adapter so that all data accesses to the physical I/O adapter are blocked in accordance with the present invention. The process starts as depicted by block 400 and thereafter passes to block 402 which illustrates a determination of whether or not a determination has been made to block all data access requests. If a determination has been made to permit all data access requests, the process passes back to block 402. Referring again to block 402, if a determination is made to block all data access requests, the process passes to block 404 which depicts setting the mode bit in the I/O controller to indicate that all data accesses are to be blocked. The process then passes back to block 402.

Figure 4B:
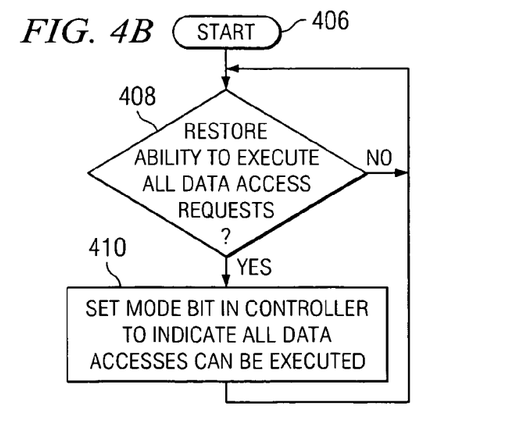
FIG. 4B depicts a high level flow chart that illustrates setting the operating mode of a physical I/O adapter to a particular mode in order to restore the data access DMA capabilities of the physical I/O adapter so that all data accesses to the physical I/O adapter are permitted in accordance with the present invention.

FIG. 4B depicts a high level flow chart that illustrates setting the operating mode of a physical I/O adapter to a particular mode in order to restore the data access DMA capabilities of the physical I/O adapter so that all data accesses to the physical I/O adapter are permitted in accordance with the present invention. The process starts as depicted by block 406 and thereafter passes to block 408 which illustrates a determination of whether or not to restore the ability to execute all data access requests. If a determination has been made not to restore the ability to execute all data access requests, the process passes back to block 408. Referring again to block 408, if a determination is made to restore the ability to execute all data access requests, the process passes to block 410 which depicts setting the mode bit in the I/O controller to indicate that all data accesses can be executed. The process then passes back to block 408.

Figure 5:
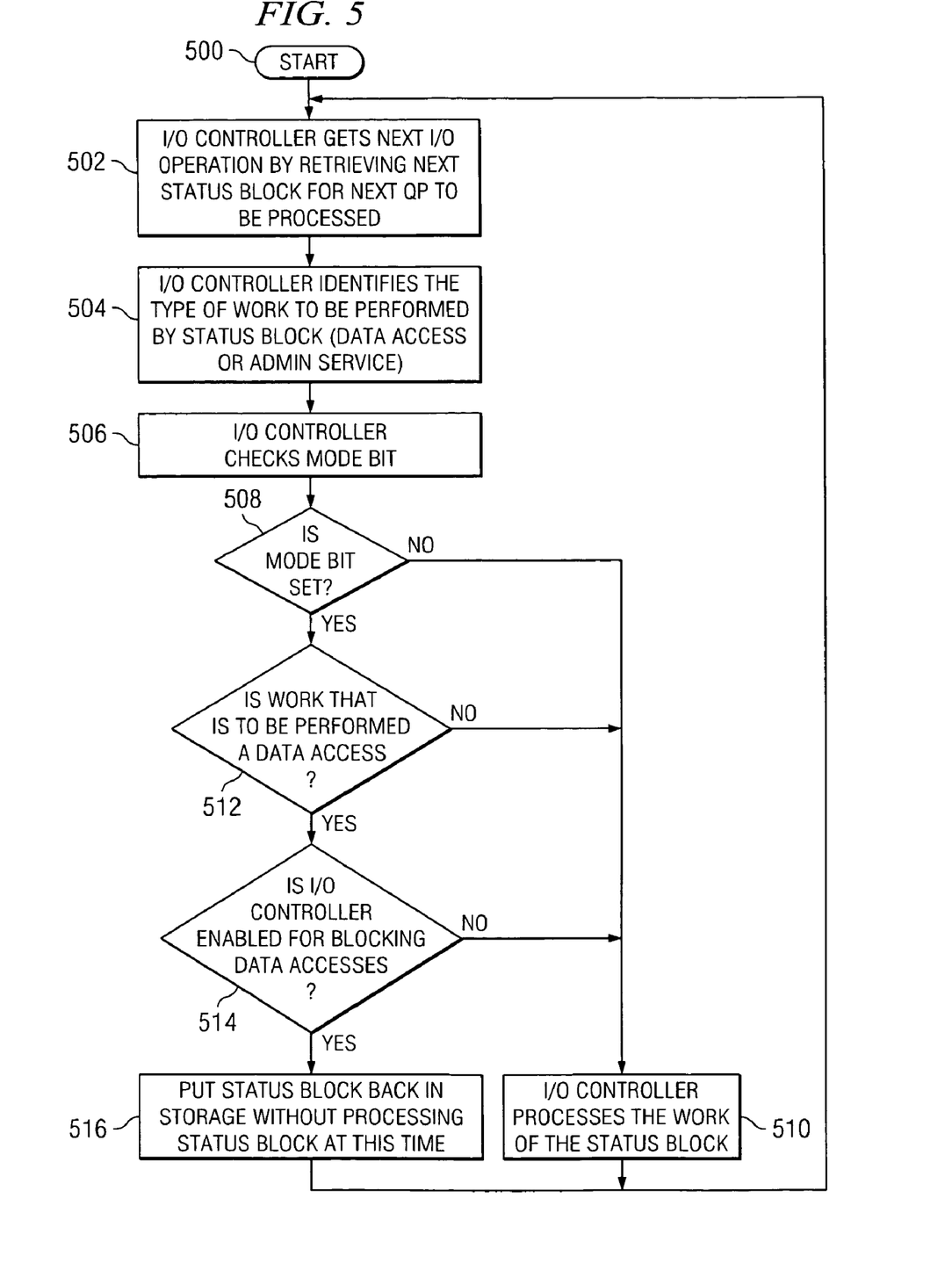
FIG. 5 depicts a high level flow chart that illustrates processing I/O requests according to the current mode of a particular physical I/O adapter in accordance with the present invention.

FIG. 5 depicts a high level flow chart that illustrates processing I/O requests according to the current mode of a particular physical I/O adapter in accordance with the present invention. The process starts as depicted by block 500 and thereafter passes to block 502 which illustrates the I/O controller getting the next I/O operation for the particular physical I/O adapter. The next I/O operation is obtained by retrieving the next status block for the next queue pair (QP) to be processed. The next queue pair to be processed is a queue pair included within the particular physical I/O adapter. Thereafter, block 504 illustrates the I/O controller identifying the type of work to be performed by the status block. The type of work will either be a data access DMA operation or an administrative services DMA operation. Each status block includes an indication of the type of work to be done by the status block. Thus, each status block indicates whether the status block will be a data access operation or an administrative services operation.

The process then passes to block 506 which depicts the I/O controller checking the mode bit for this physical I/O adapter to determine its status. Next, block 508 illustrates a determination of whether or not the mode bit is set. If a determination is made that the mode bit is not set, the process passes to block 510 which depicts the I/O controller processing the work defined by the status block. If the mode bit is not set, all DMA operations are enabled. Thus, if the mode bit is not set, data accesses as well as administrative services operations can be performed. The process then passes back to block 502.

Referring again to block 508, if a determination is made that the mode bit is set, the process passes to block 512 which depicts a determination of whether or not the work that is to be performed is a data access. If the mode bit is set, data accesses are not permitted for this physical I/O adapter. Administrative services operations, however, are permitted even when the mode bit is set.

If a determination is made that the work is not a data access, i.e. it is an administrative services operation, the process passes back to block 510 which depicts the I/O controller processing the work defined by the status block. Thus, even if the mode bit is set, if the work is an administrative services operation, the work will be performed.

Referring again to block 512, if a determination is made that the work is a data access, the process passes to block 514 which depicts a determination of whether or not the I/O controller is enabled for blocking DMA data accesses. If a determination is made that the I/O controller is enabled for blocking DMA data accesses, the process passes to block 516 which illustrates putting the status block back into storage without processing the status block at this time. By putting the status block back into storage without processing the status block, this data access is not performed at this time. This status block will be processed at a later time when data access capabilities are once again enabled for this physical I/O adapter. The process then passes back to block 502.

Referring again to block 514, if a determination is made that the I/O controller is not enabled for blocking DMA data accesses, the process passes back to block 510 which depicts the I/O controller processing the work of the status block. The process then passes back to block 502.

Figure 6:
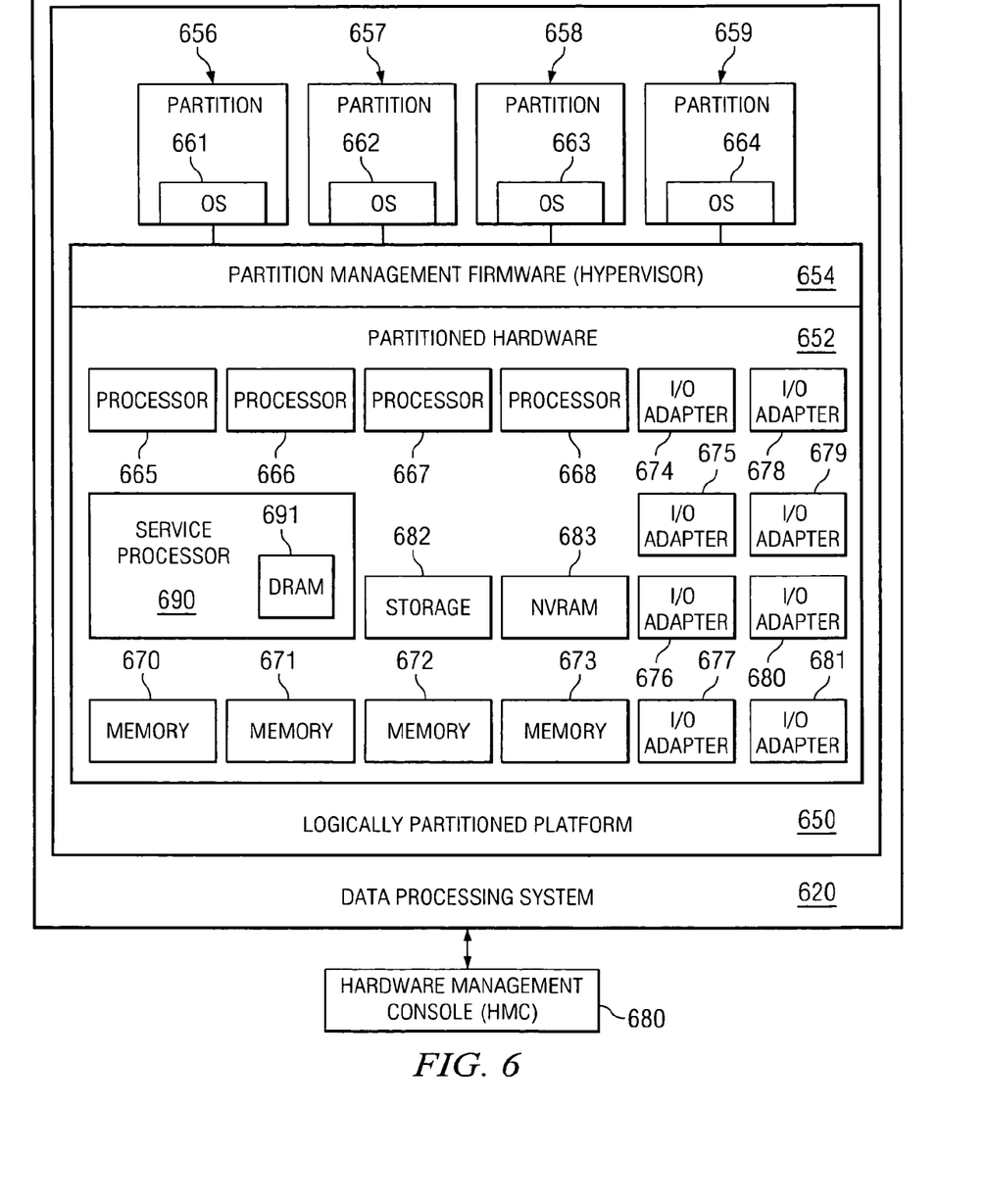
FIG. 6 is a block diagram of a logically partitioned platform that includes the present invention in accordance with the present invention.

FIG. 6 is a block diagram of a logically partitioned platform that includes the present invention. Data processing system 620 includes logically partitioned platform 650. Platform 650 includes partitioned hardware 652, partition management firmware, also called a hypervisor 654, and partitions 656-659. Operating systems 661-664 exist within partitions 656-659. Operating systems 661-664 may be multiple copies of a single operating system or multiple heterogeneous operating systems simultaneously run on platform 650.

Partitioned hardware 652 includes a plurality of SMT-capable processors 665-668, a plurality of system memory units 670-673, a plurality of input/output (I/O) adapters 674-681, and a storage unit 682. Each of the processors 665-668, memory units 670-673, NVRAM storage 683, and I/O adapters 674-681 may be assigned to one of multiple partitions 656-659. Partitioned hardware 652 also includes service processor 690. A non-volatile memory device 691, such as an NVRAM device, is included within service processor 690.

Partition management firmware (hypervisor) 654 performs a number of functions and services for partitions 656-659 to create and enforce the partitioning of logically partitioned platform 650. Hypervisor 654 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 654 allows the simultaneous execution of independent OS images 661-664 by virtualizing all the hardware resources of logically partitioned platform 250. Hypervisor 654 may attach I/O devices through I/O adapters 674-681 to single virtual machines in an exclusive mode for use by one of OS images 661-664.

A hardware management console (HMC) 680 may be coupled to service processor 690 in data processing system 620. HMC 680 is a separate computer system that is coupled to service processor 690 and may be used by a user to control various functions of system 620 through service processor 690.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a computer system for migrating data pages that are subject to DMA access by temporarily disabling selected DMA operations within a physical I/O adapter, wherein the computer system includes an I/O controller, the method comprising:

determining whether to disable data access DMA operations of said physical I/O adapter;

setting, by the I/O controller, a mode bit included within the I/O controller which sets an operating mode of said physical I/O adapter to a particular mode utilizing, according to said determination of whether to disable data access DMA operations, wherein the I/O controller sets the mode bit when data access DMA operations are to be disabled; and disabling only data access DMA operations of said physical I/O adapter when said mode bit is set, wherein the I/O controller processes administrative services DMA operations but does not process data access DMA operations continue to be performed while said data access DMA operations of said physical I/O adapter are disabled, and further wherein said administrative services DMA operations are DMA operations that are performed by said physical I/O adapter to access registers that are included within said physical I/O adapter;

including, in the physical I/O adapter, a plurality of virtual I/O adapters, wherein each one of the plurality of virtual I/O adapters is a logical representation of the physical I/O adapter, and wherein each one of the plurality of virtual I/O adapters acts independently from all other ones of the plurality of virtual I/O adapters; including, in each one of the plurality virtual I/O adapters, a queue pair, wherein the queue pair includes a send work queue for managing send messages for its virtual I/O adapter and a receive work queue for managing receive messages for its virtual I/O adapter; and including, within the physical I/O adapter, a plurality of DMA channels, wherein each one of the virtual I/O adapters has a dedicated DMA channel.

2. The method according to claim 1, further comprising:
obtaining, by the I/O controller, an I/O request to be performed;
determining, by the I/O controller, whether said I/O request is a data access DMA operation, said I/O request including an indication of whether said I/O request is a data access DMA operation or an administrative services DMA operation;
determining, by the I/O controller, a current status of said mode bit;
in response to determining that said I/O request is a data access DMA operation and that said mode bit is set, postponing processing of said I/O request by placing, by the I/O controller, the I/O request back in storage in the physical I/O adapter without the I/O controller processing the I/O request.

3. The method according to claim 2, further comprising:
in response to determining either that said I/O request is not a data access DMA operation or that said mode bit is not set, processing, by said I/O controller, said I/O request.

4. The method according to claim 2, further comprising:
postponing processing of said I/O request by placing, by said I/O controller, said I/O request back into a processing queue of said physical I/O adapter.

5. The method according to claim 1, further comprising:
associating a separate mode bit with each one of a plurality of physical I/O adapters;
disabling data access DMA operations for each one of said plurality of physical I/O adapters independently from others of said plurality of physical I/O adapters by utilizing said mode bit associated with said one of said plurality of I/O adapters.

6. The method according to claim 1, further comprising:
obtaining, by said I/O controller, an I/O request to be performed, wherein the I/O request is obtained by the I/O controller by retrieving a next status block for a next queue pair to be processed, and further wherein the next queue pair is located within the physical I/O adapter;
determining, by said I/O controller using said I/O request, whether said I/O request is a data access DMA operation, said I/O request including an indication of whether said I/O request is a data access DMA operation or an administrative services DMA operation;
determining, by said I/O controller, a current status of said mode bit; and
in response to said I/O controller determining that said I/O request is a data access DMA operation and that said mode bit is set, postponing, by said I/O controller, processing of said I/O request.

7. The method according to claim 1, further comprising:
determining to migrate data pages from one physical page to another physical page;
in response to determining to migrate data pages, determining to disable data access DMA operations of said physical I/O adapter; and
in response to determining to disable data access DMA operations, setting said mode bit.

8. The method according to claim 1, further comprising:
obtaining, by said I/O controller, an I/O request to be processed by the I/O controller;
determining, by said I/O controller using said I/O request, whether said I/O request is a data access DMA operation;
determining, by said I/O controller, a current status of said mode bit;
determining, by said I/O controller, whether the I/O controller is enabled for blocking data access DMA operations; and
in response to said I/O controller determining that said I/O request is a data access DMA operation, said mode bit is set, and said I/O controller is enabled for blocking data access DMA operations, postponing, by said I/O controller, processing of said I/O request.

9. An apparatus in a computer system for migrating data pages that are subject to DMA access by temporarily disabling selected DMA operations, the apparatus comprising:
a physical I/O adapter;
said computer system including an I/O controller;
determining means for determining whether to disable data access DMA operations of said physical I/O adapter;
the I/O controller setting a mode bit included within the I/O controller which sets an operating mode of said physical I/O adapter to a particular mode according to said determination of whether to disable data access DMA operations, wherein the I/O controller sets the mode bit when data access DMA operations are to be disabled; and
the I/O controller disabling only data access DMA operations of said physical I/O adapter when said mode bit is set, wherein the I/O controller processes administrative services DMA operations but does not process data access DMA operations while said data access DMA operations of said physical I/O adapter are disabled, and further wherein said administrative services DMA operations are DMA operations that are performed by said physical I/O adapter to access registers that are included within said physical I/O adapter;
the physical I/O adapter including a plurality of virtual I/O adapters, wherein each one of the plurality of virtual I/O adapters is a logical representation of the physical I/O adapter, and wherein each one of the plurality of virtual I/O adapters acts independently from all other ones of the plurality of virtual I/O adapters;

each one of the plurality virtual I/O adapters including a queue pair, wherein the queue pair includes a send work queue for managing send messages for its virtual I/O adapter and a receive work queue for managing receive messages for its virtual I/O adapter; and the physical I/O adapter including a plurality of DMA channels, wherein each one of the virtual I/O adapters has a dedicated DMA channel.

10. The apparatus according to claim 9, wherein the computer system includes a processor and an I/O bridge, and further wherein the I/O controller is included in the I/O bridge, and still further wherein the processor communicates with the physical I/O adapter only through the I/O bridge.

11. The apparatus according to claim 9, further comprising:

the I/O controller obtaining an I/O request to be performed;

the I/O controller determining whether said I/O request is a data access DMA operation, said I/O request including an indication of whether said I/O request is a data access DMA operation or an administrative services DMA operation;

the I/O controller determining a current status of said mode bit;

in response to determining that said I/O request is a data access DMA operation and that said mode bit is set, the I/O controller postponing processing of said I/O request by placing the I/O request back in storage in the physical I/O adapter without the I/O controller processing the I/O request.

12. The apparatus according to claim 11, further comprising:

in response to determining either that said I/O request is not a data access DMA operation or that said mode bit is not set, said I/O controller processing said I/O request.

13. The apparatus according to claim 11, further comprising:

said I/O controller postponing processing of said I/O request by placing said I/O request back into a processing queue of said physical I/O adapter.

14. The apparatus according to claim 9, further comprising:

a separate mode bit associated with each one of a plurality of physical I/O adapters, wherein said mode bit is associated with said one of said plurality of I/O adapters used to disable data access DMA operations for each one of said plurality of physical I/O adapters independently from others of said plurality of physical I/O adapters.

15. The apparatus according to claim 9, further comprising:

said I/O controller obtaining an I/O request to be performed, wherein the I/O request is obtained by the I/O controller by retrieving a next status block for a next queue pair to be processed, and further wherein the next queue pair is located within the physical I/O adapter;

said I/O controller using said I/O request to determine whether said I/O request is a data access DMA operation, wherein said I/O request includes an indication of whether said I/O request is a data access DMA operation or an administrative services DMA operation;

said I/O controller determining a current status of said mode bit; and in response to said I/O controller determining that said I/O request is a data access DMA operation and that said mode bit is set, said I/O controller postponing processing of said I/O request.

16. The apparatus according to claim 9, further comprising:

determining means for determining to migrate data pages from one physical page to another physical page;

in response to determining to migrate data pages, determining means for determining to disable data access DMA operations of said physical I/O adapter; and said mode bit being set in response to determining to disable data access DMA operations.

17. The apparatus according to claim 9, further comprising:

said I/O controller obtaining an I/O request to be processed by the I/O controller;

said I/O controller using said I/O request to determine whether said I/O request is a data access DMA operation;

said I/O controller determining a current status of said mode bit;

said I/O controller determining whether the I/O controller is enabled for blocking data access DMA operations; and in response to said I/O controller determining that said I/O request is a data access DMA operation, said mode bit is set, and said I/O controller is enabled for blocking data access DMA operations, said I/O controller postponing processing of said I/O request.

18. A computer program product that is stored in a computer recordable-type medium for migrating data pages that are subject to DMA access by temporarily disabling selected DMA operations within a physical I/O adapter, the computer program product comprising:

instructions for determining whether to disable data access DMA operations of said physical I/O adapter;

instructions for setting, by the I/O controller, a mode bit included within the I/O controller which sets an operating mode of said physical I/O adapter to a particular mode according to said determination of whether to disable data access DMA operations, wherein the I/O controller sets the mode bit when data access DMA operations are to be disabled; and instructions for disabling only data access DMA operations of said physical I/O adapter when said mode bit is set, wherein the I/O controller processes administrative services DMA operations but does not process data access DMA operations while said data access DMA operations of said physical I/O adapter are disabled, and further wherein said administrative services DMA operations are DMA operations that are performed by said physical I/O adapter to access registers that are included within said physical I/O adapter.

* * * * *